Figure 1:
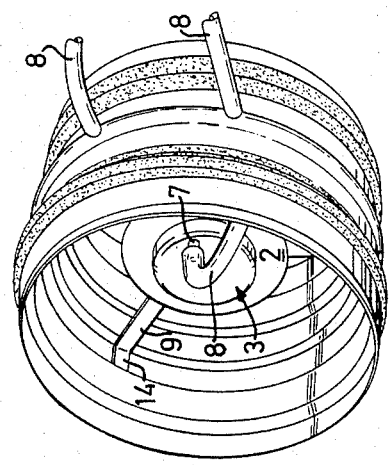

United States Patent [19]

Steen

[11] Patent Number: 4,523,481
[45] Date of Patent: Jun. 18, 1985

[54] MEASUREMENT UNIT FOR DETERMINING GAS FLOW THROUGH A CONDUIT AND MEASURING MEANS DESIGNED TO BE INCLUDED IN SUCH A MEASURING UNIT

[75] Inventor: Gunnar Steen, Tomelilla, Sweden
[73] Assignee: Stifab AB, Jonkoping, Sweden
[21] Appl. No.: 558,417
[22] PCT Filed: Apr. 22, 1983
[86] PCT No.: PCT/SE83/00155
 § 371 Date: Nov. 29, 1983
 § 102(e) Date: Nov. 29, 1983
[87] PCT Pub. No.: WO83/03896
 PCT Pub. Date: Nov. 10, 1983

[30] Foreign Application Priority Data
Apr. 23, 1982 [SE] Sweden ................................ 8202562

[51] Int. Cl.³ ............................................. G01F 1/42
[52] U.S. Cl. ................................................. 73/861.61
[58] Field of Search ..................... 73/861.52, 861.61; 138/40

[56] References Cited

U.S. PATENT DOCUMENTS

| | | | |
|---|---|---|---|
| 2,687,645 | 8/1954 | Velten et al. | 73/861.61 |
| 4,008,611 | 2/1977 | Turocy | 73/861.52 |
| 4,290,314 | 9/1981 | Geronime | 73/861.52 |
| 4,290,315 | 9/1981 | Gröberg | 73/861.61 |

Primary Examiner—Charles A. Ruehl
Attorney, Agent, or Firm—Young & Thompson

[57] ABSTRACT

A measurement unit for determining gas flow through a conduit by means of measuring pressure differential over an orifice arranged in the conduit (1), and to a measuring means designed to be included in such measurement unit. The purpose of the invention is to achieve a measurement unit and a measuring means which produce reliable readings and are of simple construction. This is achieved by means of an orifice centrally arranged in a section of the conduit (1) made as a flat circular disc (2) perpendicular to the central axis of said section. Round pressure measurement boxes (3) are arranged close to the sides of the disc. The inner chambers (13) of the boxes communicate with the space close to the disc and immediately outside the lateral wall (11) of the box via aperture means (10) between the lateral wall edge portion adjacent to the disc and the surface of the disc. The pressure chamber (13) inside each box defined by the box and the surface of the disc, is in communication with a pressure differential meter outside the conduit section via a flexible pressure differential meter outside the conduit section via a flexible pressure lead-out hose (8) coupled between a pressure lead-through nipple (7) in the wall of the box (3) and the meter. The diameter of the disc is at least 50% of the inner diameter of the conduit section (1) and the outer diameter of the box is at most 60% of the diameter of the disc.

10 Claims, 5 Drawing Figures

MEASUREMENT UNIT FOR DETERMINING GAS FLOW THROUGH A CONDUIT AND MEASURING MEANS DESIGNED TO BE INCLUDED IN SUCH A MEASURING UNIT

The invention relates to a measurement unit for determining gas flow through a conduit by means of measuring pressure differential over an orifice means arranged in the conduit.

An air flow meter of this type is previously known by Swedish Patent Application No. 7909222-7. In many cases, this known meter functions entirely satisfactorily, but provides in certain cases values which are not completely reliable. The reason for this can be that the meter is mounted close to conduit features which affect the flow conditions (e.g. the flow velocity), such as a bend or a T-branch. Furthermore, the known meter is relatively expensive to manufacture.

The purpose of the present invention is to achieve a new type of measurement unit which does not have the above mentioned disadvantages of the known meter, and which has a simpler design, so that it can be manufactured at lower cost.

According to the invention, this purpose is achieved by a measurement unit as described by way of introduction above, which is characterized in that the orifice means comprises within a straight circular section of the conduit, a centrally mounted, flat circular disc, the plane of which is perpendicular to the central axis of the section of conduit, that the disc has a diameter less than the interior diameter of the conduit section but is at least 50% of said interior diameter, that on both sides of the disc there is arranged, coaxially to the disc, a rotationally symmetrical pressure measurement box, the lateral wall of which, which points towards the disc, is arranged with its edge portion in close proximity to the surface of the disc, that between said edge portion and the surface there are aperture means through which a pressure measurement chamber inside the box, and defined by the walls of the box and the surface of the disc, is in communication with the space in close proximity to the disc but outside the lateral wall of the box, and that in a wall of each box there is a pressure lead-through means with a portion outside the box to which there is connected a pressure lead-off line which runs through the wall of the conduit and can then be connected to a pressure differential meter.

The straight, circular conduit section of the measurement unit can be for example a circular conduit nipple mounted in an air duct or the like, but the measurement unit can of course also be mounted in a straight circular conduit.

The measurement unit, which makes it possible to measure airflow via fixed measurement lead-off lines, permits installation right next to a conduit detail, e.g. a bend or T-branch, virtually without practically affecting the measurement result at all. The special design also makes it possible to make the proper adjustments even at low air velocities in the conduit system. The measurement unit can be combined with an adjustment damper, thus producing an adjustable measurement unit.

The volumes in the two boxes (i.e. the spaces of their pressure chambers) provide an average value for the various pressures occurring over a cross-sectional area of the conduit in the vicinity of or upstream of the measurement unit. These variations in pressure can for example be caused by different flow velocities at the "inner radius" and the "outer radius" of a conduit elbow immediately upstream of the measurement unit.

The particular shape of the pressure measurement boxes on either side of the disc has the result that the disturbance in the gas flow (the air flow) intentionally achieved with the aid of the disc, and the uncontrolled disturbances generated by flow obstacles (e.g. a duct elbow) right next to the measurement unit, will produce a stable pressure field in the boxes, and the pressure differential between the pressures in the box chambers will be proportional to the gas flow through the conduit in which the measurement unit is mounted. Even rather extreme mountings of the measurement unit have proved to give measured values of the flow deviating less than 5% from the actual values.

The pressure lead-off lines from the pressure chambers of the boxes are preferably flexible, and can be plastic hoses for example which are connected, outside the walls of the conduit, to a suitable pressure differential meter, such as a U-tube manometer.

According to a preferred embodiment, the boxes consist of two identical tin-shaped casings with a cylindrical lateral wall and an end wall sealingly connected thereto and in which the pressure lead-through means is mounted.

The boxes can be suitably mounted close to the opposite sides of the disc by a bolt passing through the centers of the boxes and provided with a nut, the longitudinal axis of said bolt coinciding with the central axis of the conduit section. The head of the central bolt and the nut screwed onto said bolt tighten against the outsides of the box end walls. The central bolt passes through and is carried by a rubber gasket which is mounted in an opening in the central portion of the disc and which seals both against the disc and the bolt.

The disc can be suitably fixed in the conduit by means of legs fastened to the edge portion of the disc and which extend preferably radially out from the disc and are fastened at their ends away from the disc to the inside of the conduit wall preferably by means of angled foot members. Ths disc should be provided with at least two such mounting legs, although three legs are preferable.

The aperture means between the edge portion of the box lateral wall and the adjacent surface of the disc can comprise one or more narrow gaps at the box wall edge portion in close proximity to the disc.

Alternatively, the aperture means can consist of a plurality of small openings or notches in the box wall edge portions adjacent to the disc.

In the last mentioned case, the annular edge portion of each box can be provided with a plurality of evenly spaced notches along the entire edge portion, thus providing it with a toothed edge.

The lateral wall of each box is suitably a circular cylindrical lateral wall, the outer diameter of the box being at most 60% of the diameter of the disc. The edge of each box side wall directed towards the disc can also be an unbroken annular surface disposed in a plane parallel to the plane of the disc, there being in each side of the disc in the area of the annular surface at least three spaced raised heels or ridges forming abutments against which said edge annular surface of the lateral wall rests, the arcuate, narrow gap between the free annular surface and the disc being aperture means which are defined by the abutments, the annular surface and the surface of the disc.

A measuring means suited for placement in a conduit (or in a pipe), the cross section of which is not necessarily round, and which is intended to form with the conduit/pipe a measurement unit for measuring pressure differential over the means, is characterized in that the means comprises a flat, circular disc designed to be disposed transversely to the direction of flow and that on each side of the disc there is arranged, coaxially to the disc, a rotationally symmetrical pressure measurement box, the lateral wall of which pointing towards the disc being arranged with its edge portion in close proximity to the surface of the disc, between said edge portion and the surface there being aperture means through which a pressure measurement chamber inside the box and defined by the wall of the box and the surface of the disc, is in communication with the space in close proximity to the disc, outside the lateral wall of the box, and in that in the wall of each box there is a pressure lead-through means with a portion outside the box to which there is connected a pressure lead-off line.

The invention will now be described in more detail with reference to a preferred embodiment shown in the drawings.

Figure 2C:
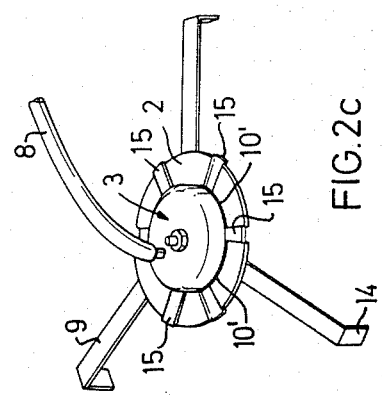
Figure 2A:
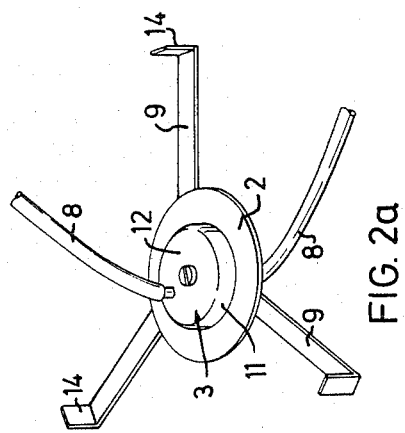
Figure 2B:
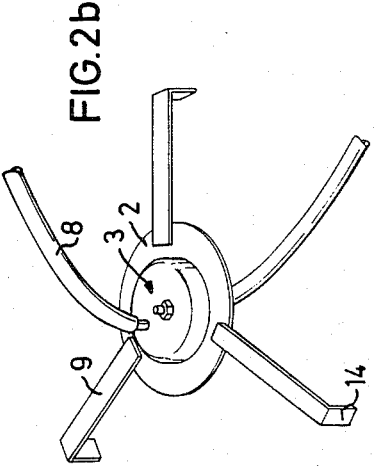
Figure 3:
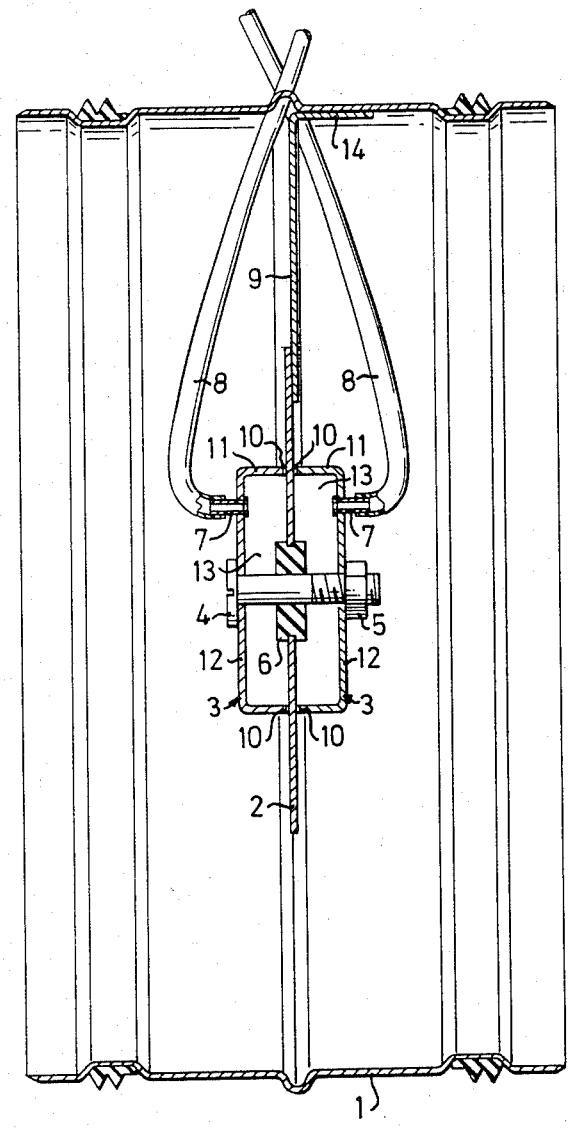

FIG. 1 shows in perspective a measurement unit according to the invention made as a conduit nipple, FIGS. 2a and 2b show the disc provided with pressure measurement boxes and associated mounting legs, without the surrounding circular section of conduit, FIG. 2c shows a disc with boxes and with radial ridges on either side of the disc, these ridges supporting each box and effecting narrow gaps between the edge of the box and the surface of the disc, and FIG. 3 shows the measurement unit according to FIG. 1 in diametrical longitudinal section.

Reference will now be made to the Figures, and especially to FIG. 3 in which the straight circular conduit section of the measurement unit is shown in the form of a conduit nipple 1 provided with external surrounding sealing means. In the middle of the conduit nipple and perpendicular to the central axis thereof, a circular disc 2 is mounted, the diameter of which is at least 50% of the inner diameter of the conduit nipple in the plane of the disc. A pair of identical opposing pressure measurement boxes 3 are mounted coaxially to the disc 2 on opposite sides thereof. Each box has a cylindrical lateral wall 11 which is closed, spaced from the disc, by an end wall 12 parallel to the plane of the disc. The boxes 3 are held in place on opposite sides of the disc by a central bolt 4 with a nut 5 screwed thereon. This central bolt is carried by and extends through a rubber seal 6 which is fixed in an opening in the central portion of the disc 2. The rubber seal 6 seals both against the disc 2 and against the bolt 4.

A pressure chamber 13 in each box 3 is defined, as can be seen, by the lateral wall 11 of the box, the end wall 12 and the adjacent surface of the disc 2. The pressure chamber 13 inside the disc is in communication with the space close to the disc and immediately outside the lateral wall of the box through aperture means 10 between the edge portion of the lateral wall 11 pointing towards the disc and the surface of the disc. These aperture means can consist of one or more narrow gaps, or can comprise a plurality of small openings or notches in the edge of the lateral wall 11.

In the end walls 12 of the boxes, there are pressure lead-through means 7 in the form of hose nipples; plastic hoses 8 are connected to the portions of the nipples outside the boxes and extend out through the wall of the conduit nipple 1; and there the hoses can be connected (in a manner not shown) to a pressure differential meter for measuring the pressure difference between the two chambers 13, to determine the gas flow through the conduit nipple 1.

The disc 2, which thus carries the two boxes 3, is in turn fixed in the conduit nipple 1 by means of three radial legs 9 which are fixed to the edge portion of the disc 2 and extend out to the inside of the conduit nipple 1 which they abut with angled foot portions 14. These foot portions can be welded in place, screwed in place or only under tension against the inside of the conduit nipple 1.

The aperture means 10 in FIG. 3 can, as was pointed out above, be for example narrow gaps, small openings or cut-outs in the edge of the annular box lateral wall 11 directed towards the disc 2.

In order to simplify manufacture of the boxes 3, it can be suitable to achieve the aperture means without requiring cut-outs, openings or cavities in the edges of the boxes. The aperture means can instead be achieved by mounting the boxes so that their annular edges directed towards the disc are located at a certain, small distance from the adjacent surface of the disc 2.

A simple method of achieving this is shown in FIG. 2c, and consists in providing each side of the disc 2 with three or more raised heels or ridges 15 which form abutments against which the unbroken edge surface located in one plane, of the box lateral wall 11 rests. With three such abutments on each side of the disc 2, there is obtained for each box 3, three arcuate gaps or slots 10' spaced by the abutments 15, between the free edge of the box and the surface of the disc, which constitute the aperture means. The abutments are achieved most simply by providing the disc 2 with, in this case, six radial grooves or indentations which are alternating the directed towards opposite sides of the disc, so that every other groove forms a protruding ridge 15 on one side of the disc.

The above special section of the description has exemplified the invention with reference to only one suitable embodiment, but many other embodiments are of course conceivable within the scope of the following claims. Thus, the invention is of course not limited to measurement units with straight, circular conduit or pipe sections, or to measuring means designed solely for such conduit or pipe sections. Curve conduit sections with non-circular cross sections can also be used in connection with the invention.

I claim:

1. Measurement unit for determining gas flow through a conduit or duct by means of measuring pressure differential over an orifice means arranged in the conduit or duct, characterized in that said orifice means comprises within a straight, circular section (1) of the conduit, a centrally mounted, flat circular disc (2), the plane of which is perpendicular to the central axis of the section of conduit, said disc (2) having a diameter less than the interior diameter of the conduit section (1) but being at least 50% of said interior diameter, and in that on each side of the disc (2) there is arranged, coaxially to the disc, a rotationally symmetrical pressure measurement box (3) having a lateral wall (11) pointing towards the disc and which is arranged with its edge portion in close proximity to the surface of the disc, between said edge portion and the surface there being aperture means (10) through which a pressure measurement chamber (13) inside the box, and defined by the walls (11, 12) of the box and the surface of the disc, is in communication with the space in close proximity to the disc but outside the lateral wall (11) of the box, and in that in a wall of each box (3) there is a pressure lead-through means (7) with a portion outside the box to which there is connected a pressure lead-off line (8) which runs through the wall of the conduit (1) and can there be connected to a pressure differential meter.

2. Measurement unit according to claim 1, characterized in that the boxes (3) are two identical casings each with a cylindrical lateral wall (11) and an end wall (12) sealingly connected thereto and in which the pressure lead-through means (7) is mounted.

3. Measurement unit according to claim 1, characterized in that the boxes (3) are held in close proximity to opposite sides of the disc (2) by a bolt (4) passing through the centers of the boxes and provided with a nut (5), the longitudinal axis of said bolt coinciding with the central axis of the conduit section (1), said central bolt (4) passing through and being carried by a rubber gasket (6) which is mounted in an opening in the central portion of the disc (2) and which seals both against the disc (2) and the bolt (4).

4. Measurement unit according to claim 1, characterized in that the disc (2) is fixed in the conduit by means of legs (9) fastened to the edge portion of the disc and which extend preferably radially out from the disc and are fastened at their ends away from the disc to the inside of the conduit wall (1) preferably by means of angled foot members (14).

5. Measurement unit according to claim 1, characterized in that the aperture means consist of one or more narrow gaps (10) at the box (3) wall (11) edge portion in close proximity to the disc.

6. Measurement unit according to claim 1, characterized in that the aperture means consist of a plurality of small openings (10) or notches in the box wall (11) edge portion in close proximity to the disc.

7. Measurement unit according to claim 6, characterized in that the edge portion of each box (3) has a plurality of evenly spaced notches (10) along the entire said edge portion thus providing it with a toothed edge.

8. Measurement unit according to claim 1, characterized in that the lateral wall of each box (3) is a circular cylindrical lateral wall (11), the outer diameter of the box being at most 60% of the diameter of the disc (2).

9. Measuring unit according to claim 1, characterized in that the edge of each box (3) lateral wall (11) directed towards the disc (2) consists of an unbroken annular surface disposed in a plane parallel to the plane of the disc, that in each side of the disc there is in the region of the annular surface at least three spaced, raised heels or ridges (15) forming abutments against which said edge annular surface of the lateral wall rests, the arcuate, narrow gaps between the free annular surface and the disc (2) constituting the aperture means (10'), which are thus defined by the abutments, the annular surface and the surface of the disc.

10. Measuring means designed to be placed in a fluid flow in a conduit or a pipe, for measuring pressure differential over the means, characterized in that the means comprises a flat, circular disc (2) designed to be disposed transversely to the directional flow and that on each side of the disc (2) there is arranged, coaxially to the disc, a rotationally symmetrical pressure measurement box (3), the lateral wall (11) of which pointing towards the disc being arranged with its edge portion in close proximity to the surface of the disc, between said edge portion and the surface there being aperture means (10, 10') through which a pressure measurement chamber (13) inside the box and defined by the box wall (11, 12) and the disc surface is in communication with the space in close proximity to the disc but outside the lateral wall (11) of the box, and that in the wall of each box (3) there is a pressure lead-through means (7) to the portion of which outside the box a pressure lead-off line (8) can be connected.

* * * * *